United States Patent [19]

Klenk et al.

[11] Patent Number: 4,593,721
[45] Date of Patent: Jun. 10, 1986

[54] TUBULAR PACKAGING CASING

[75] Inventors: Ludwig Klenk, Oestrich; Klaus Heyse, Bad Soden, both of Fed. Rep. of Germany

[73] Assignee: Hoechst Aktiengesellschaft, Frankfurt am Main, Fed. Rep. of Germany

[21] Appl. No.: 662,711

[22] Filed: Oct. 19, 1984

[30] Foreign Application Priority Data

Oct. 20, 1983 [DE] Fed. Rep. of Germany ....... 3338054

[51] Int. Cl.$^4$ ............................................. F16L 11/12
[52] U.S. Cl. ................... 138/118.1; 138/119; 138/128; 138/177; 428/192; 206/802
[58] Field of Search ............ 138/118.1, 118, 119, 138/128, 145, 151, 152, 156, 167, 170, 177, 178; 426/105, 135, 138; 17/1 R, 42, 49; 428/192; 206/802; 383/107

[56] References Cited

U.S. PATENT DOCUMENTS

| | | | |
|---|---|---|---|
| 2,181,886 | 12/1939 | Goodman | 138/118.1 |
| 2,350,158 | 5/1944 | Evans | 138/123 |
| 2,366,710 | 1/1945 | Dimond | 138/118.1 |
| 2,939,501 | 6/1960 | Corman et al. | 383/107 |
| 3,737,329 | 6/1973 | Strelchuk | 383/107 X |
| 4,401,136 | 8/1983 | Porrmann et al. | 138/118.1 |
| 4,478,661 | 10/1984 | Lewis | 138/128 X |

FOREIGN PATENT DOCUMENTS

| | | |
|---|---|---|
| 2848987 | 2/1983 | Fed. Rep. of Germany . |
| 3127444 | 2/1983 | Fed. Rep. of Germany . |
| 8302387 | 7/1983 | PCT Int'l Appl. . |

*Primary Examiner*—James E. Bryant, III
*Attorney, Agent, or Firm*—Schwartz, Jeffery, Schwaab, Mack, Blumenthal & Evans

[57] ABSTRACT

Disclosed is a tubular packaging casing suitable for use as a sausage casing and a flat film for forming same, the flat film being shaped into a tubing and comprising cellulose hydrate, preferably fiber-reinforced cellulose hydrate. The edges of the flat film are bonded by means of a sewing thread, and in the area of the sewing thread, the packaging casing has an increased content of plasticizer and, optionally, also an increased moisture content. Furthermore, a flat film for producing the packaging casing is disclosed, which has an increased content of plasticizer and optionally also of water along its two edges.

14 Claims, 3 Drawing Figures

TUBULAR PACKAGING CASING

BACKGROUND OF THE INVENTION

The present invention relates to a tubular packaging casing, suitable for use as a sausage casing having a seam extending along its longitudinal axis. The packaging comprises a tubing formed from a flat film of cellulose hydrate, preferably fiber-reinforced cellulose hydrate, having a plasticizer content of from about 5 to 20% by weight, relative to the weight of the casing. The two edges of the flat film, which are formed into the tubing, are joined by means of a sewing thread.

The present invention additionally relates to a flat film for producing the packaging casing.

A tubular packaging casing of this type, as well as the flat film used to form the casing, are known. The use of the tubular casing as a sausage casing is also known. However, in the known casing, the material to be packaged is stuffed manually.

These packaging casings and flat films have the disadvantage that they are not very well suited for use in automatic, high-speed stuffing and clipping devices intended for tubular casings without a seam. As is known, these devices employ relatively high stuffing pressures. As a result thereof, the seam zone of the packaging casing is subjected to much higher strain than in the case of manual stuffing. Therefore, a high tear resistance of the casing material in the area of the holes made by the needle is required.

After automatic stuffing with sausage meat, it has been observed that a sewn sausage casing comprising fiber-reinforced cellulose hydrate, with a customary moisture content of, for example, up to 10% by weight and a glycerol content of 5 to 15% by weight, relative to the weight of the casing, usually exhibits three tears, mutually offset by an angle of about 120°, in the area around the puncture holes made by the needle. These tears, which start from the center of each puncture hole, extend in an outward direction.

The sewn packaging casings used to date exhibit still further disadvantages during stuffing. The diameters of the puncture holes formed by the needle during sewing are necessarily larger than the diameter of the sewing thread. As a consequence thereof, areas of free space are obtained in the packaging casing between the thread and the periphery of the puncture holes.

SUMMARY OF THE INVENTION

It is therefore an object of the present invention to provide an improved tubular packaging casing.

Another object of the present invention is to provide a tubular casing having a seam region, which can be filled mechanically at high speeds and at increased pressures.

Yet another object of the present invention is the provision of a tubular packaging casing which, when used as a sausage casing, is substantially free from free spaces in the area of the puncture holes.

Still another object of the present invention is to provide a tubular packaging casing which is free from tears at the periphery of the individual puncture holes.

Yet another object of the present invention is the provision of a flat film which can be formed into a tubular packaging casing which has the preferred characteristics identified immediately above.

In accordance, therefore, with one aspect of the present invention, there has been provided a tubular packaging casing, preferably a sausage casing, comprising a tubing formed from a flat film which comprises cellulose hydrate by overlapping the edges of the film. The tubing includes a seam region extending along the longitudinal axis of the tubing in the area of the overlapped edges of the film, the seam region being at a distance from the film edges, means, comprising a sewing thread, along the seam region, for bonding the overlapped edges together, wherein the tubing comprises a moisture content of from about 5 to 15% by weight relative to the weight of the casing and a plasticizer in an amount from about 5 to 20% by weight relative to the weight of the casing and an increased amount of the plasticizer in the seam region of up to about 30% by weight relative to the weight of the casing. In a preferred embodiment, the increased plasticizer content ranges from about 21 to 25% by weight, and the seam region also has an increased moisture content of from about 16 to 25% by weight, both weight percents being relative to the total weight of the casing In accordance with another aspect of the present invention, there has been provided a flat film for producing a tubular packaging casing, comprising cellulose hydrate and including a main portion having a moisture content of from about 5 to 15% by weight relative to the total weight of the film and a plasticizer in an amount from about 5 to 20% by weight relative to the total weight of the film and a region in the vicinity of, but at a distance from, each of the longitudinally extending edges of the film and running parallel thereto having an increased plasticizer content of up to about 30% by weight.

The packaging casing and the flat film intended for producing the casing result in the advantage that the holes formed during sewing are free from tears. According to the present invention, when the needle perforates the film, a bulge of material is formed which starts out from the center of the puncture and rises, like a crater, in the direction of the puncture. When the needle is withdrawn, this crater substantially disappears and intimately adjoins the sewing thread, so that there is practically no free space left between the film and the thread. In this connection, the effect of the plasticizer is completely surprising, for these kind of substances are usually employed to produce a plasticizing effect on the cellulose hydrate, i.e., to improve the flexibility and reduce the brittleness of the casing material, to control the moisture content and to prevent drying-out of the material during storage, because the rate of water loss is reduced, and to prevent the formation of mold.

Further objects, features and advantages of the present invention will become apparent from the detailed description of preferred embodiments which follows when considered with the attached figures of drawing.

DETAILED DESCRIPTION OF PREFERRED EMBODIMENTS

Figure 1:
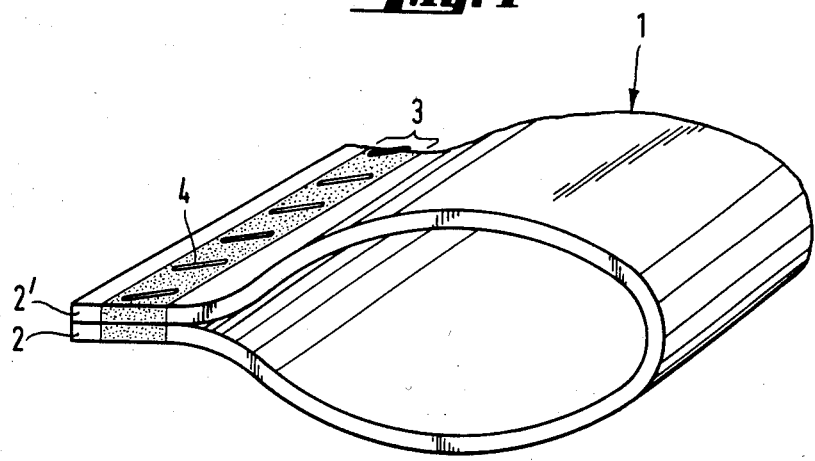
FIG. 1 is a perspective view of a preferred embodiment of the tubular casing.

According to the present invention, the flat film, and thus the resulting packaging casing, is made of cellulose hydrate or fiber-reinforced cellulose hydrate, as is, for example, described in European Patent Application No. 0,054,162. The flat film is usually prepared from viscose which is an alkaline solution of sodium cellulose xanthate. The viscose is either extruded in the form of a web without a fiber reinforcement or is applied to a web-like fiber structure, for example, comprising paper. Then the viscose is spun, i.e., coagulated, by the addition of suitable liquids.

Thereafter, the coagulated product is regenerated to cellulose hydrate in the form of a gel, washed with water and treated with plasticizer. Prior to the drying process, in which the web-like cellulose hydrate is adjusted to a certain water content of usually about 5 to 15% by weight, relative to the weight of the casing, one or both surfaces of the product is optionally coated with further compounds to produce surface layers having particular properties. The content of plasticizer resulting from the plasticizing treatment is from about 5 to 20% by weight, in particular, from about 10 to 18% by weight, relative to the weight of the casing.

The essential characteristic of the flat film and thus of the tear-free, sewn packaging casing produced therefrom, is that, in a portion of the film, namely in the area of the sewn seam, the content of plasticizer is greater than in the remaining parts of the packaging casing. This increased content of plasticizer is preferably up to about 30% by weight, in particular, from about 21 to 25% by weight, relative to the weight of the casing. It has been found that an increased content of plasticizer in the total packaging casing would cause problems during sewing and, in particular, during the feeding of the flat film to the sewing machine.

The edges themselves of the web-like flat film which are overlapped in the tubing, i.e., the web edge, should likewise not be provided with the increased content of plasticizer, for such an increased content would make them too soft and wavy for sewing. In a preferred embodiment, the content of plasticizer is, therefore, increased in the two strip-like zones which extend at a distance from and parallel to the respective adjacent web edge. It will also be sufficient to produce these strip-like zones with interruptions, so that in the extreme case, the increased content of plasticizer is only present intermittently, namely, at those spots where the needle pierces the material.

To increase the content of plasticizer, those zones of the flat film which are intended to receive the increased plasticizer content, are, for example, passed along a roller applicator system. If uninterrupted, strip-like zones are to be produced, the rollers have a smooth or continuous surface, and if the zones are applied intermittently, the rollers have a structured surface. The plasticizer is applied in the form of an aqueous solution, so that not only the content of plasticizer, but also the water content is increased. Particularly, water content values of from about 16 to 25% by weight, in particular of from about 18 to 23% by weight, relative to the weight of the casing, are achieved. Excess plasticizer solution can, for example, be removed by means of a doctor blade.

The plasticizer used for the packaging casing of cellulose hydrate or fiber-reinforced cellulose hydrate can be selected from any of the compounds suitable for this purpose, especially from polyhydric alcohols, such as sorbitol, propane diol or glycerol.

It is particularly advantageous to start sewing immediately after the application of the plasticizer solution, for, on the one hand, the material is capable of absorbing a sufficient quantity of aqueous plasticizer solution within a relatively short time, i.e., about 2 to 5 seconds, whereas, on the other hand, there is the disadvantageous effect that after a certain time the increased amount of plasticizer in the seam area is reduced to the concentration in the neighboring material due to diffusion and evaporation. At a sewing speed of, for example, 10 m/min, the applicator station for the plasticizer should therefore be arranged at least about 30 cm to 85 cm before the sewing needle. If the flat film is provided with a water vapor-tight surface layer, the plasticizer is applied to the uncoated surface. For sewing, the flat film is advantageously folded in the middle along its longitudinal axis in a way such that the areas having the plasticizer coating face in an outward direction. In this folded state the flat film is sewn along the web edges and then further processed in accordance with its intended use. For example, the sewn casing is wound up as a flat tubing or cut into individual sections which are closed at one end.

It is particularly advantageous to use a sewing thread of a swellable material, for example, a cotton yarn or a viscose-rayon yarn. Due to absorption of liquid from the environment, i.e., from the casing material or the contents of the casing, the yarn swells, whereby an additional sealing effect between the film and the thread is accomplished.

In its most preferred embodiment, the packaging casing is suitable as a sewn sausage casing. By means of customary peeling devices, the casing can be removed from the sausage meat without any problems. Depending on the sausage type used in each case, the packaging casing can include a surface coating known per se on its outer or inner surface, for example, a water vapor barrier layer, a layer improving the ease of peeling or a layer preventing mold formation. After the sausage production, the differences in plasticizer content have usually disappeared, because, prior to stuffing, the sausage casing is usually subjected to a water treatment by the sausage manufacturer, during which process the plasticizer is substantially removed. The increased water content in the seam region is reduced to the average water content of the material a relatively short time after the application of the plasticizer solution. Since, during sewing, an increased water content is advantageous, sewing should be performed as soon as possible after the application of the aqueous plasticizer solution, as described above.

Figure 2:
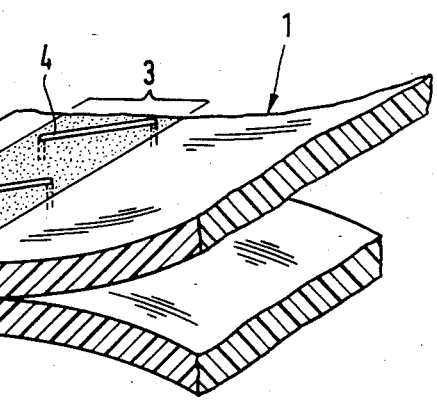
FIG. 2 is an enlarged view of a section of FIG. 1.
Figure 3:
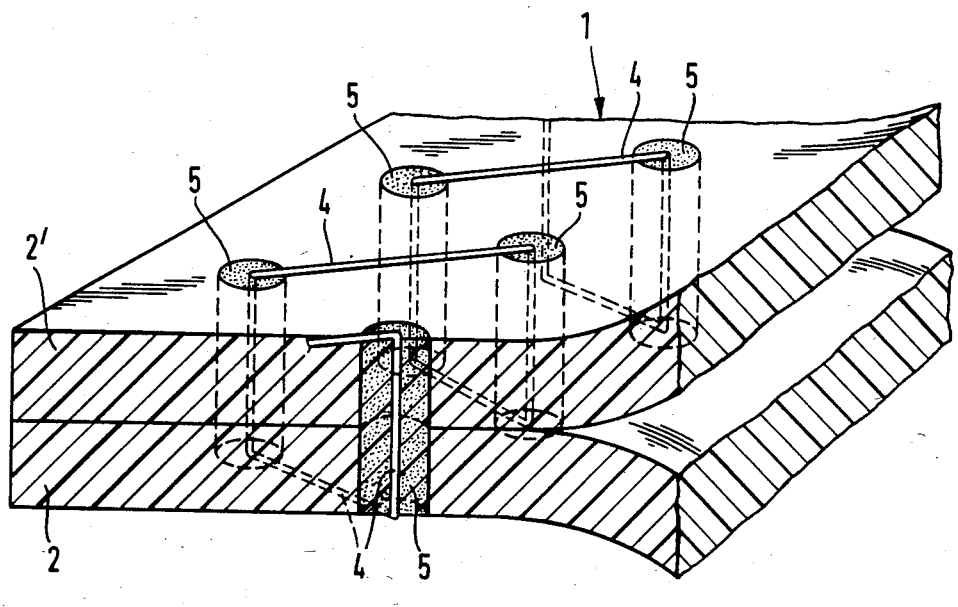
FIG. 3 shows an enlarged view of a section of another embodiment of the tubular casing, analogous to FIG. 2.

With reference now to the figures, the tubular casing is formed from a flat film shaped into a tubing 1 with overlapping edges 2,2'. The edges 2,2' are bonded by a sewing thread 4. In FIGS. 1 and 2, the increased plasticizer and, optionally, water content, is present in the uninterrupted strip-like zone 3. In FIG. 3, the area of increased content is present in punctiform zones 5.

What is claimed is:

1. A tubular packaging casing, comprising a tubing formed from a flat film comprising cellulose hydrate by overlapping the edges of said film, said tubing including:

(a) a seam region extending along the longitudinal axis of said tubing in the area of the overlapped edges of said film, said seam region being at a distance from the film edges; and (b) means, comprising a sewing thread, along said seam region, for bonding said overlapped edges, wherein said tubing comprises a moisture content of from about 5 to 15% by weight relative to the weight of the casing and a plasticizer content in an amount from about 5 to 20% by weight relative to the weight of the casing and an increased amount of said plasticizer in said seam region of up to about 30% by weight relative to the weight of the casing.

2. A tubular packaging casing as claimed in claim 1, wherein said plasticizer is present in said seam region in an amount from about 21 to 25% by weight.

3. A tubular packaging casing as claimed in claim 1, wherein said plasticizer is present in the non-seam region of said tubing in an amount from about 10 to 18% by weight.

4. A tubular packaging casing as claimed in claim 1, wherein said tubing comprises an increased moisture content in said seam region of from about 16 to 25% by weight relative to the weight of the casing.

5. A tubular packaging casing as claimed in claim 4, wherein said increased moisture content ranges from about 18 to 23% by weight.

6. A tubular packaging casing as claimed in claim 1, wherein said tubing comprises fiber-reinforced cellulose hydrate.

7. A tubular packaging casing as claimed in claim 1, wherein said plasticizer comprises a polyhydric alcohol.

8. A tubular packaging casing as claimed in claim 7, wherein said polyhydric alcohol comprises sorbitol, propane diol or glycerol.

9. A tubular packaging casing as claimed in claim 8, wherein said polyhydric alcohol comprises glycerol.

10. A tubular packaging casing as claimed in claim 8, wherein said seam region comprises two strip-like zones which extend at a distance from and parallel to the adjacent film edges.

11. A tubular packaging casing as claimed in claim 1, wherein said plasticizer content is essentially constant in said seam region.

12. A tubular packaging casing as claimed in claim 1, wherein said seam region includes a plurality of puncture points whereat said sewing thread pierces said film, and wherein said plasticizer content is increased in at least the areas adjacent said plurality of puncture points.

13. A tubular packaging casing as claimed in claim 1, wherein said sewing thread comprises a swellable material.

14. A tubular packaging casing as claimed in claim 13, wherein said swellable material comprises a cotton yarn or a viscose-rayon yarn.

* * * * *